March 22, 1966  H. A. ENDE  3,241,754
CENTRIFUGATION CELLS
Filed Jan. 2, 1964
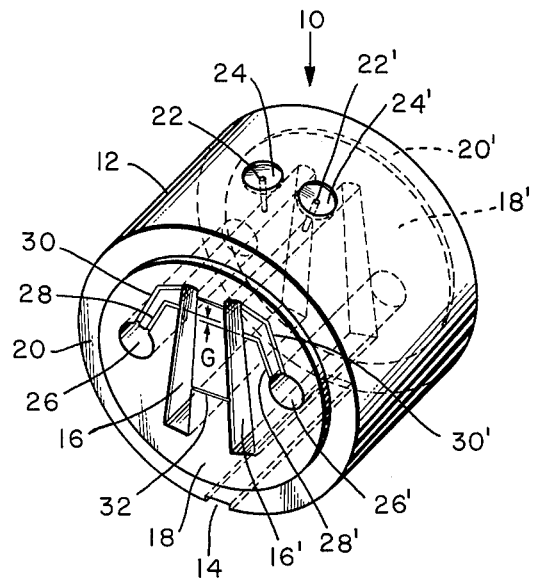
INVENTOR.
HERBERT A. ENDE
BY 
ATTORNEY United States Patent Office 3,241,754
Patented Mar. 22, 1966

3,241,754
CENTRIFUGATION CELLS
Herbert A. Ende, Cary, N.C., assignor to Monsanto
Company, a corporation of Delaware
Filed Jan. 2, 1964, Ser. No. 335,148
8 Claims. (Cl. 233—26)

This invention relates to improvements in the design of what are commonly referred to as double-sector centrifugation cells and, more particularly, to a modification of such cells such that, in operation, the two liquid columns contained therewithin shall automatically and precisely be adjusted to equal weights.

The use of the ultracentrifuge as an aid in studying macromolecules and colloidal substances has its origins in the investigations of Svedberg and Nichols in 1923 and has had a relatively steady advance to a point where, today, it enjoys the status of a vital and highly versatile discipline. The ultracentrifuge has now reached a degree of development such that routine applications may involve centrifugation of samples at speeds conventionally up to 60,000 r.p.m. to thereby generate gravitational fields adequate to separate materials with differences either in molecular weight or density. The ultracentrifuge has been particularly useful in the fields of biochemistry and polymer chemistry in permitting quantitative and qualitative studies of high molecular weight substances.

The refinements in the design of present day ultracentrifuges has been accompanied by improvements in the design of optical systems, sample cells, detection apparatus, etc. to a state that many studies previously impossible are now carried out routinely in a short period of time with a gratifying degree of accuracy. For example, the differential absorption of sedimenting material, as compared to the solvent, using visible and ultraviolet light sources provides a rapid method for studying compositions of, for example, biological and synthetic polymeric materials.

Since the introduction of quantitative density gradient centrifugation by Meselson, Stahl and Vinograd, Procedures of the National Academy of Science, volume 43, page 51 (1957), there has been an increasing demand for a refined centrifuge cell better lending itself to experiments in a way not accommodated by conventional cells. Currently, single-sectored cells are used for density gradient experiments; however, in order to most expediently obtain all the information available, it becomes most important to ascertain the exact position of the "baseline," i.e. that line optically defined by the refractive index gradients of the solvent occupying one of the two sectors, which baseline is representative of the particular solvent-additive mixture under observation.

As the matter of principle, conventional double-sector cells could be utilized to achieve this result, but it is imperative that the two liquid columns attain a precise equality of height in each sector. A recently described double-sector cell would allow the two liquid columns to attain equal heights, but has certain drawbacks, a primary one being the necessity to correct for dilution, a further disadvantage being the fact that the column heights would differ from one run to another. Equality of the two liquid columns is, moreover, especially necessary in the density gradient experiments when interference optics are employed. This is because interference optics essentially involves the comparison of the refractive indices of the liquid in one sector with that in the other at comparable distances from the axis of cell rotation. The liquid in the two sectors is composed of two solvents differing in refractive index and, upon centrifugation, the heavier solvent sediments towards the bottom of the cell. This sedimentation is strongly opposed by back diffusion, and, at a given speed the flow of the heavier solvent through a unit area within the cell due to sedimentation and diffusion is equal, thus establishing a stable density gradient within the two sectors. It can be shown that the magnitude of the density gradient depends on the column heights of the liquid. Thus, if the column heights in the two sectors do not match precisely, the refractive index at a given distance from the axis of rotation differs in one sector from that in the other. As a result of this inequality in column heights, the baseline in the interference diagram becomes skewed; whereas, for proper evaluation of such a diagram, it is imperative that the baseline be straight. Thus, straightness of the baseline can only be assured by insuring that the column heights in both sectors are equal.

The desirability of a double-sector cell design capable of automatically and precisely assuring an equality of column heights of the liquids occupying the two sectors is, therefore, clearly indicated.

In my co-pending application S.N. 335,046, filed January 2, 1964, there is disclosed an improved centrifugation cell design similar to that of the present invention wherein an overflow groove communicates between each sector of a double-sector cell and its respective reservoir, a substantial equality of heights of the liquid columns contained within the respective sectors or sample chambers being assured by virtue of locating the overflow grooves to juncture with their respective chambers at equal levels. However, due to limitations inherent in machining techniques, it has been found difficult, if not impossible, to assure a precise equality of the levels at which the overflow grooves are caused to juncture with their respective sample chambers, though the disparity is quite small (less than 0.003 inch) and can, for many purposes, be tolerated. In other instances, however, it is essential that a precise equality of the column heights be assured.

It is, therefore, an object of the present invention to provide an improved double-sector cell design for use in ultracentrifugation procedures, which cell, when subjected to a centrifugal field of sufficient magnitude, will automatically attain a precise equality in the heights of the liquid columns occupying the respective sectors or sample chambers.

A further object of my invention is the provision of a double-sector centrifugation cell having means operative to insure the equalization of the heights of the liquid columns contained within each cell, such column height equalization taking place automatically and only when the cell is subjected to a predetermined minimum centrifugal force.

Still another object is the provision of a double-sector centrifugation cell having the above related capabilities and which is of such design as to compensate for any variance in the levels of the junctures of the overflow grooves with their respective sectors or chambers.

According to my invention, the foregoing and other objects are attained by an easily effected modification of a conventional double-sector centrifugation cell for use in ultracentrifugation procedures, which modification renders such cell operative to automatically establish an equality in the heights in the liquid columns contained within each sector or sample chamber upon subjection of the cell to a predetermined minimum centrifugal force, this being accomplished even in the presence of a variance in the levels of the junctures of the overflow grooves with their respective sectors. This modification takes the form of a system of grooves and reservoirs communicating with the respective sectors in such a fashion that, upon rotation of the cell at a sufficiently high speed, any liquid exceeding a predetermined level within the sectors, as measured in a radial direction through such sectors, will be caused to be discharged into the reservoirs. This is accomplished by the provision of an overflow groove communicating between each sector or sample chamber and its associated reservoir, the juncture of each groove with its respective sector being located at substantially equal levels within the sectors. There is further provided a transfer groove interconnecting the two sectors or sample chambers at a level below the junctures of the overflow grooves, this transfer groove being of smaller cross-sectional dimension relative to that of the overflow grooves. With this arrangement, upon subjecting the cell to a predetermined speed of rotation, any liquid within each chamber exceeding the level of its juncture with its respective overflow groove will be urged by the centrifugal forces acting thereupon through such groove and into its respective reservoir. Should there exist a variance in the levels of the junctures of the overflow grooves with the chambers, there will occur, upon subjecting the cell to a still higher speed of rotation, a flow of liquid from the cell of the higher level to the cell containing the lower level, any excess thereby generated within the sector initially containing the lower level being passed by way of its overflow groove to the associated reservoir. Any transfer of liquid between the two sectors by way of the transfer groove is preferably delayed pending discharge of each sector or chamber through its respective overflow groove, this being accomplished by virtue of forming the transfer groove to be of a smaller cross-sectional dimension relative to the overflow grooves to thereby afford a greater resistance to centrifugally induce flow. To precisely correct for any dilution caused by the transfer of liquid from one sector to the other, the level of the meniscuses in the respective sectors is observed after the cell has reached a rotational speed sufficient to completely discharge any liquid existing above the level of the junctures of the overflow grooves, but below the rotational speed requisite to effect a flow through the transfer groove due to the centrifugal influence upon any variance in the heights of the liquid columns contained within the sectors. By this technique, the quantity of transfer, and therefore the extent of dilution, is easily accounted for.

In ultracentrifugation procedures generally, there is provided a relatively massive and precisely configured rotor mounted to be rotated at extremely high speeds, conventionally in excess of 60,000 r.p.m., within an enclosed, evacuated chamber to better retard temperature rises due to atmospheric friction. One or more cylindrical wells are formed in such rotor to extend, in their axial dimension, substantially parallel to the axis of rotation of the rotor element, these wells being shaped to receive cell assemblies of conventional construction. Such a cell assembly normally comprises a barrel or external housing, the cell proper being positioned therewithin at substantially its mid-point. Once the cell has been properly positioned within the barrel, cell windows, of quartz or other suitable material, are positioned in each end of the barrel to bear in fluid-tight engagement against the two end surfaces of the cell proper. So assembled, the barrel is then mounted within the rotor and a run commenced. The general details of ultracentrifuge construction and operation are well and comprehensively presented in Ultracentrifugation in Biochemistry by Howard K. Schachman, 1959, Academic Press, which is hereby incorporated by this reference thereto.

With the understanding that the constructional and operational details of the ultracentrifuge, as above generally referred to, are not considered to constitute a part of my invention, reference shall now be had to the details of the cell proper, an illustrative, but not limitative, embodiment of which is shown in the drawing. As there shown, on a scale approximately five times actual size, the improved cell construction which constitutes my invention takes the form of a double-sector cell, generally indicated by reference numeral 10, having a cylindrical body member 12 provided with a longitudinally extending positioning groove 14, which groove is designed to mate with a tongue member formed integrally along the internal wall of the barrel housing, now shown, which tongue-and-groove arrangement assures proper alignment of the cell within the barrel and of the barrel within the rotor. In the following discussion, it will be assumed that the ultracentrifuge rotor is mounted to spin about a substantially vertical axis, the barrel being positioned within the rotor a radial distance from the axis of rotation, conventionally in the range of 60 to 65 mm. The barrel, and the associated cell illustrated in the drawing, will normally be positioned within the rotor so that their longitudinal dimension parallels the axis of spin. The result is that cell 10 is subjected to high-speed rotation about an axis substantially paralleling the axial dimension of the cell in such fashion that the centrifugal forces generated will act vertically downward across the face of the cell, viewed in the drawing, in the direction of arrow 10.

Within the cell body, there is formed a pair of sector-shaped sample chambers 16, 16'; each chamber subtending a sector angle conventionally ranging between two and four degrees. When the cell has been properly positioned within the rotor preparatory to a run, the side walls of these sector-shaped chambers extend along radial lines intersecting the spin axis. The chambers 16, 16' extend entirely through the axial dimension of the cylindrical body 12 to be exposed at either end thereof in the plane of the slightly raised end surfaces 18, 18'. The cylindrical body 12 is provided with recessed shoulder portions 20 completely surrounding raised end surfaces 18, 18' to promote the integrity of the fluid seal formed between such end surfaces and the previously referred to cell windows, which latter are mounted in pressing engagement thereagainst. The cell is filled after it has been clamped within the barrel between the cell windows by way of individual filler conduits 22, 22' which, on assembly, register with suitably placed ports in the barrel, not illustrated. Plug depressions 24 surround each of the filler conduits to receive and seat plugs, not shown, inserted through the barrel wall to seal the sample chambers.

It is to be acknowledged that the cell structure described up to this point is that of a conventional double-sector cell which may easily be modified according to the present invention, as will now be described. Disposed laterally of each of the sample chambers there is formed a reservoir 26 extending between one of the end surfaces 18 axially of the cell body to a depth suitable to accommodate the anticipated overflow, 10 mm. having been found adequate. Obviously, the required capacity of the reservoirs will, in large measure depend upon the level of the junctures of the overflow grooves. Communicating between each reservoir 20 and its associated chamber 16 is a V-shaped overflow groove 28 which groove is machined to intersect the side wall of each sector-shaped sample chamber at a level substantially equal to that of the juncture in the remaining chamber. Vent grooves 30, 30' communicate with each chamber and its respective reservoir 26, 26' to provide essential pressure equalization therebetween.

Interconnecting the two sample chambers 16, 16' at a level below their junctures with their respective overflow grooves 28, 28', there is provided a V-shaped transfer groove 32 which is of a smaller cross-sectional area than that of the overflow grooves 28, 28'. In actual practice, it was found convenient to size the overflow grooves to a 60°, 0.003 inch V-shape and to size the transfer groove 32 to a 60°, 0.0003 inch V-shaped. By this means, any flow through either the overflow grooves or the transfer groove was found to be retarded at speeds less than 8,000 r.p.m.; that, at speeds between 8,000 and 15,000 r.p.m., excess liquid was urged to flow through the respective overflow grooves and, at speeds exceeding 15,000 r.p.m., and, in the event there was a disparity in the liquid column heights occupying the two sectors, there occured a flow along transfer groove 32 from that sector containing the highest level to the sector of lower lever, followed by discharge from the lower level sector through its overflow groove. It is between 8 and 15 thousand r.p.m., when discharge through the overflow grooves 28, 28' has ceased, but when no transfer of liquid between the two sectors via transfer grooves 32 has taken place, that any disparity in the level of the meniscuses of the respective chambers is observed as a basis for later correcting for any dilution due to liquid transfer. A typical disparity in liquid column heights is denoted in the drawing by the gap labeled G.

Because the overflow and transfer grooves are sufficiently small to obstruct fluid passage under forces less than that obtained at speeds of less than approximately 8,000 r.p.m., the sample-filled cell may be manipulated by the operator without risking a depletion of the liquid in either cell below the level of the respective overflow groove junctures.

In operation, each sector or sample chamber 16, 16' is arbitrarily filled to a level above the juncture with its respective overflow groove 28, 28'. The solvent-additive mixture occupies that sector-chamber previously determined to have the higher juncture point, i.e. that sector whose overflow groove junction creates the higher liquid column; in this manner, any flow along transfer groove 32 will be from the sector containing the solvent-additive to that sector containing the additive. In a cell incorporating the groove dimensions hereinabove referred to, excess liquid in both the sectors will be caused to flow through their respective overflow grooves into the reservoirs at a speed of approximately 8,000 r.p.m. Once the liquid column heights have stabilized, i.e. dropped to the levels of the overflow groove junctures, a picture is taken by well known means in order to locate and record the position of the meniscuses. As the cell is further accelerated to the desired speed for study, there will occur at approximately 15,000 r.p.m. a flow from the sector containing the solvent-additive to that sector containing the additive by virtue of the greater column heights of the solvent-additive, and therefore, by virtue of its greater mass, the liquid masses within each sector ultimately being equalized under the influence of the centrifugal force by way of the transfer groove. The excess generated due to transfer into the sector containing the additive is continuously discharged through its associated overflow groove, the common height of the columns being determined by the position of the lower overflow groove junction. The results observed may then be corrected for additive dilution due to any transfer which may have taken place.

It may now be appreciated that there has been herewith disclosed a novel and unobvious modification of a double-sector centrifugation cell which enables one to operate the cell with an equality of liquid column heights, even where, due to machining limitations, there is a disparity between the levels of the respective overflow groove-sector junctions. Obviously, numerous modifications and variations of the present invention will suggest themselves in the light of the above teachings. It is, therefore, to be understood that, within the scope of the appended claims, the invention may be practiced otherwise than as specifically described herein.

What is claimed is:

1. A self-adjusting cell for use in centrifugation procedures comprising a cell body, a pair of sample chambers extending through said body, each chamber having inboard and outboard ends, a pair of reservoirs formed in said body, means fluidly interconnecting each said chamber to one of said reservoirs, the junctures of said fluid interconnecting means with their respective chambers being at substantially equidistant points as measured from the outboard ends of said chambers, inter-chamber fluid transfer means interconnecting said chambers at points intermediate their outboard ends and the junctures of said fluid interconnecting means with said chambers, whereby, upon subjecting said cell body to a predetermined centrifugal force, fluid within each chamber exceeding said juncture points will discharge into the respective reservoirs, any disparity within the resulting fluid column heights within each said chamber being resolved by a centrifugally induced transfer of fluid via said transfer means from that chamber containing the greater column height to that chamber containing the lesser column height to thereby establish a precise equality of fluid column heights within the respective chambers.

2. A centrifugation cell as defined in claim 1 wherein said fluid interconnecting means and said transfer means are in the form of grooves formed in the surface of said cell body.

3. A cell as defined in claim 2 wherein said overflow and transfer grooves are V-shaped in cross-section and are of such depth as to obstruct fluid passage therethrough when said cell is subjected to inertia forces below a predetermined level.

4. A device as recited in claim 3 wherein the depth of said overflow grooves is less than 0.004 inch and the depth of said transfer groove is less than 0.002 inch, whereby centrifugally induced flow through said overflow grooves is caused to be completed prior to commencement of flow through said transfer groove to thereby minimize dilution of the contents of one chamber by that of the other.

5. A centrifugation cell as defined in claim 2 and further characterized by a pair of vent means, each said vent means communicating between the inboard region of one of said chambers and its respective reservoir.

6. The cell as defined in claim 5 wherein each of said vent means is characterized by a V-shaped vent groove formed in the surface of said cell body, said vent grooves being of such depth as to obstruct fluid passage therethrough when said cell is subjected to inertia forces below a predetermined level.

7. An automatic level-adjusting cell for use in centrifugation procedures comprising a cylindrical cell body, radially spaced, sector-shaped twin sample chambers extending axially through said body, each chamber having inboard and outboard ends, fluid passage means interconnecting each said chamber with one of said reservoirs, the junctures of said fluid passage means with their respective chambers being at substantially equidistant points as measured from the outboard ends of said chambers, inter-chamber fluid transfer means interconnecting said chambers at points intermediate their outboard ends and the junctures of said fluid passage means with said chambers, whereby, upon subjecting said cell body to a predetermined centrifugal force, fluid within each chamber exceeding said juncture points will discharge into the respective reservoirs, any disparity within the resulting fluid column heights within said chambers being resolved by a centrifugally induced transfer of fluid via said transfer means from the chamber containing the greater column height to that chamber containing the lesser column height to thereby establish a precise equality of fluid column heights within the respective chambers.

8. In a cell for use in centrifugation procedures, said cell being of the type characterized by a pair of radially spaced, sector-shaped sample chambers formed in a cylindrical cell body, each of said chambers having inboard and outboard ends, the improvement comprising a pair of reservoirs, each disposed laterally of one of said chambers, a pair of V-shaped overflow grooves, each of said overflow grooves communicating between one of said reservoirs and one of said chambers, the juncture of said grooves with said chambers being at substantially equidistant points as measured from the outboard ends thereof, inter-chamber fluid transfer means interconnecting said chambers at points intermediate their outboard ends and the junctures of said fluid interconnecting means with said chambers and a vent groove communicating between the inboard end region of each said chamber and one of said reservoirs, whereby, upon subjecting said cell to a predetermined centrifugal force, fluid within each chamber exceeding said juncture points will discharge into the respective reservoirs, any disparity within the resulting fluid column heights within said chamber being resolved by a centrifugally induced transfer of fluid, via said transfer means, from the chamber containing the greater column height to that chamber containing the lesser column height to thereby establish a precise equality of fluid column heights within the respective chambers.

References Cited by the Examiner
UNITED STATES PATENTS
2,340,825  2/1944  Stern _____ 233—66

OTHER REFERENCES

Laboratory Investigation, volume 2, Number 6, Nov.–Dec. 1953, published by Harper and Brothers, Philadelphia, pages 441 to 446.

M. CARY NELSON, *Primary Examiner.*